US012636829B2

(12) United States Patent
Shou et al.

(10) Patent No.: US 12,636,829 B2
(45) Date of Patent: May 26, 2026

(54) SYSTEM AND PROCESS FOR ROBOT-ASSISTED THREE-DIMENSIONAL FABRICATION OF CONTINUOUS FIBER-REINFORCED THERMOSET COMPOSITES

(71) Applicant: BOARD OF TRUSTEES OF THE UNIVERSITY OF ARKANSAS, Little Rock, AR (US)

(72) Inventors: Wan Shou, Fayetteville, AR (US); Nahid Tushar, Fayetteville, AR (US)

(73) Assignee: BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 58 days.

(21) Appl. No.: 18/732,578

(22) Filed: Jun. 3, 2024

(65) Prior Publication Data

US 2024/0399659 A1 Dec. 5, 2024

Related U.S. Application Data

(60) Provisional application No. 63/505,566, filed on Jun. 1, 2023.

(51) Int. Cl.

| | |
|---|---|
| *B29C 64/227* | (2017.01) |
| *B29C 64/141* | (2017.01) |
| *B29C 64/295* | (2017.01) |
| *B29C 64/336* | (2017.01) |
| *B29K 63/00* | (2006.01) |
| *B29K 105/08* | (2006.01) |

(Continued)

(52) U.S. Cl.
CPC .......... *B29C 64/227* (2017.08); *B29C 64/141* (2017.08); *B29C 64/295* (2017.08); *B29C 64/336* (2017.08); *B33Y 10/00* (2014.12); *B33Y 30/00* (2014.12); *B29K 2063/00* (2013.01); *B29K 2105/08* (2013.01); *B29K 2307/04* (2013.01)

(58) Field of Classification Search
CPC ... B29C 64/227; B29C 64/141; B29C 64/295; B29C 64/336; B29C 64/106; B29C 64/209; B33Y 10/00; B33Y 30/00; B29K 2063/00; B29K 2105/08; B29K 2307/04
See application file for complete search history.

(56) References Cited

U.S. PATENT DOCUMENTS

| | | | |
|---|---|---|---|
| 2017/0341300 A1* | 11/2017 | Rudolph | ................. B29C 64/20 |
| 2019/0009472 A1* | 1/2019 | Mark | ................... B29C 64/393 |

(Continued)

OTHER PUBLICATIONS

Abdullah, A.M., Ding, Y., He, X., Dunn, M. and Yu, K., 2022. Direct-write 3D printing of UV-curable composites with continuous carbon fiber. Journal of Composite Materials, p. 00219983221127182.

(Continued)

*Primary Examiner* — Michael M. Robinson
(74) *Attorney, Agent, or Firm* — Crowe & Dunlevy, P.C.

(57) ABSTRACT

The invention relates to a system and process for robot-assisted three-dimensional fabrication of continuous fiber-reinforced thermoset composites (CFRTCs). The system includes a robot and a printhead assembly having a continuous fiber feeding module, a resin coating module, and an in-situ resin curing module. The system and process use resistive Joule heating to locally cure the continuous fiber material on demand during the fabrication of the CFRTCs.

14 Claims, 13 Drawing Sheets

(51) Int. Cl.
   *B29K 307/04*      (2006.01)
   *B33Y 10/00*      (2015.01)
   *B33Y 30/00*      (2015.01)

(56)                References Cited

U.S. PATENT DOCUMENTS

2020/0206977  A1*    7/2020   Bruening  ............... B29C 64/321
2022/0001615  A1*    1/2022   Yourdkhani  .......... B29C 64/165

OTHER PUBLICATIONS

Hao, W., Liu, Y., Zhou, H., Chen, H. and Fang, D., 2018. Preparation and characterization of 3D printed continuous carbon fiber reinforced thermosetting composites. Polymer Testing, 65, pp. 29-34.

He, X., Ding, Y., Lei, Z., Welch, S., Zhang, W., Dunn, M. and Yu, K., 2021. 3D printing of continuous fiber-reinforced thermoset composites. Additive Manufacturing, 40, p. 101921.

Li, N., Li, Y. and Liu, S., 2016. Rapid prototyping of continuous carbon fiber reinforced polylactic acid composites by 3D printing. Journal of Materials Processing Technology, 238, pp. 218-225.

Ma, S., Yang, H., Zhao, S., He, P., Zhang, Z., Duan, X., Yang, Z., Jia, D. and Zhou, Y., 2021. 3D-printing of architectured short carbon fiber-geopolymer composite. Composites Part B: Engineering, 226, p. 109348.

Robertson, I.D., Yourdkhani, M., Centellas, p. J., Aw, J.E., Ivanoff, D.G., et al., 2018. Rapid energy efficient manufacturing of polymers and composites via frontal polymerization. Nature, 557(7704), pp. 223-227.

Sharma, S., 2021. Composite Materials: Mechanics, Manufacturing and Modeling. CrC press.

Shi, B., Shang, Y., Zhang, P., Cuadros, A.P., Qu, J., Sun, B., Gu, B., Chou, T.W. and Fu, K.K., 2020. Dynamic capillary-driven additive manufacturing of continuous carbon fiber composite. Matter, 2(6), pp. 1594-1604.

Tian, X., Liu, T., Yang, C., Wang, Q. and Li, D., 2016. Interface and performance of 3D printed continuous carbon fiber reinforced PLA composites. Composites Part A: Applied Science and Manufacturing, 88, pp. 198-205.

Yeong, W.Y. and Goh, G.D., 2020. 3D printing of carbon fiber composite: the future of composite industry. Matter, 2(6), pp. 1361-1363.

Zhang, Z., Liu, R., Li, W., Liu, Y., Luo, H., Zeng, L., Qiu, J. and Wang, S., 2021. Direct writing of continuous carbon fibers/epoxy thermoset composites with highstrength and low energy-consumption. Additive Manufacturing, 47, p. 102348.

Ziaee, M., Johnson, J.W. and Yourdkhani, M., 2022. 3D Printing of Short-Carbon-Fiber-Reinforced Thermoset Polymer Composites via Frontal Polymerization. ACS Applied Materials & Interfaces, 14(14), p. 16694-16702.

* cited by examiner 148     150     152

154

144
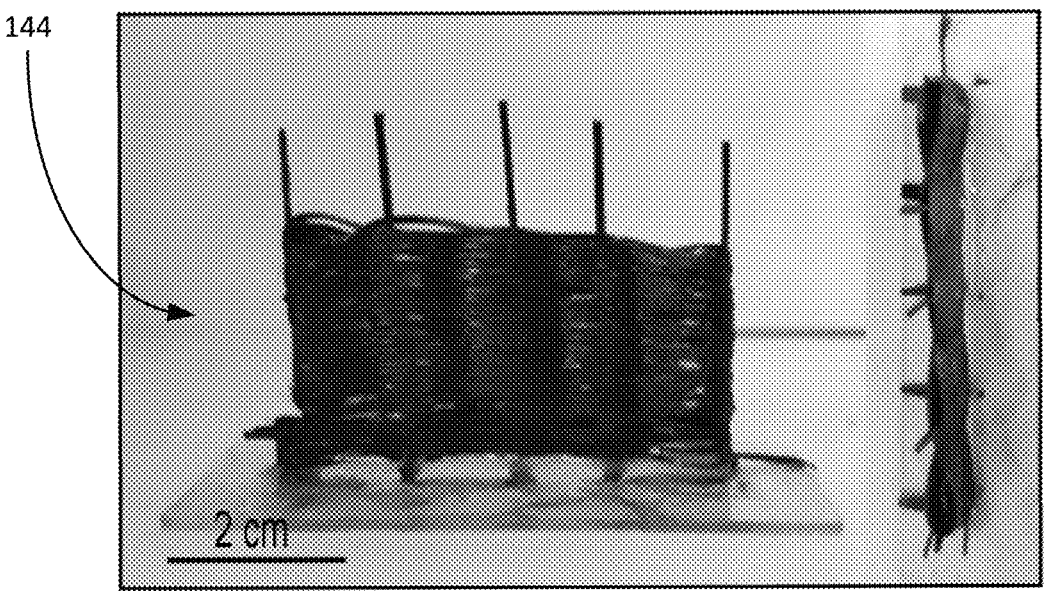
FIG. 7E
144
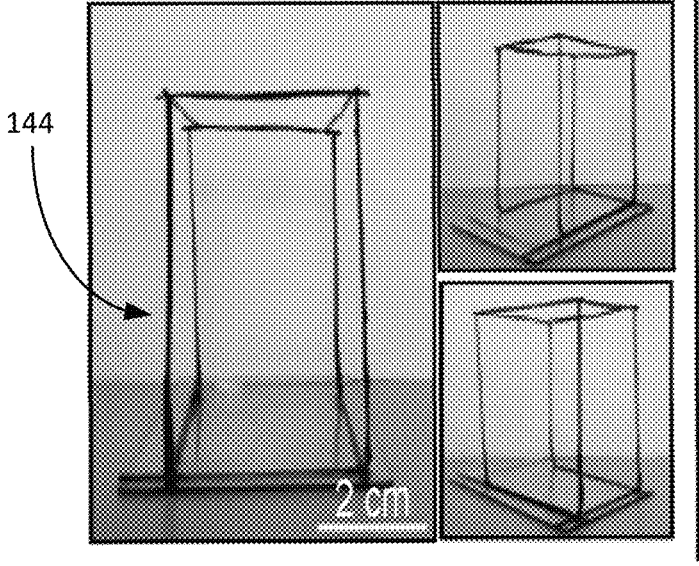
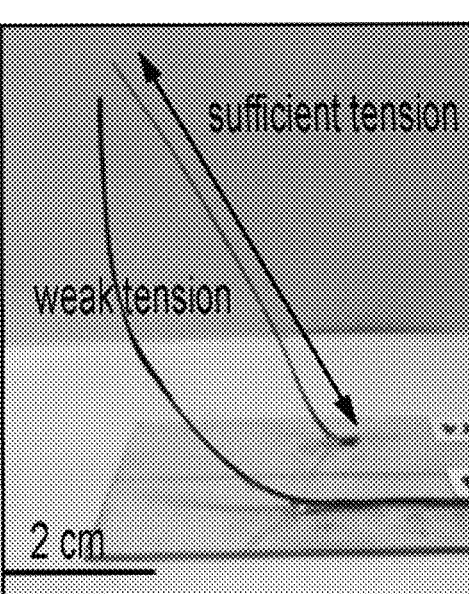
FIG. 7F          FIG. 7G

SYSTEM AND PROCESS FOR ROBOT-ASSISTED THREE-DIMENSIONAL FABRICATION OF CONTINUOUS FIBER-REINFORCED THERMOSET COMPOSITES

CROSS-REFERENCE TO RELATED APPLICATIONS

This application claims the benefit of U.S. Provisional Patent Application No. 63/505,566 filed on Jun. 1, 2023, and incorporates the provisional application by reference in its entirety into this document as if fully set out at this point.

BACKGROUND OF THE INVENTION

1. Field of the Invention

The subject matter disclosed herein generally relates to a system and process for robot-assisted three-dimensional fabrication of continuous fiber-reinforced thermoset composites.

2. Description of the Related Art

Carbon fiber reinforced polymer (especially thermally cured thermoset composites) composites are widely used in aerospace, automotive, defense, and wind energy sectors due to their excellent stiffness and strength, thermal stability, and chemical resistance; however, the traditional manufacturing process, which relies on large ovens or autoclaves to cure the thermosets at high temperatures (e.g., about 180° C.) for several hours, is time-consuming and energy-inefficient. Accordingly, such composite manufacturing approaches are costly. Further, traditional manufacturing approaches may be limited in dimensions due to the sealed chamber for post-processing, and traditional manufacturing methods cannot meet the demand for complex structures. Therefore, there is a need to develop disruptive manufacturing technology for continuous fiber-reinforced composites that address the above challenges.

Three-dimensional (3D) printing of continuous fiber-reinforced composite materials is gaining increasing attention globally; however, current research mainly focuses on short fibers as the reinforcement or thermoplastics as the matrix. Although recent research shows some potential for additive manufacturing of carbon fiber reinforced composites, limited complex 3D structures were demonstrated and may still rely on high-temperature chambers for curing.

Recently, a frontal polymerization strategy was reported for thermally cured thermoset composite manufacturing; however, the reported material has to be carefully synthesized, and the reported strategy may not directly apply to widely adopted commercial resins. Although increasing progress is being made for continuous fiber-reinforced thermoset composite printing, simultaneously achieving energy-efficient, complex structures, generalizable, large-scale, and high mechanical performance remains challenging.

SUMMARY OF THE INVENTION

Accordingly, it is an object of this invention to provide a system and process for fabricating complex 3D structures from continuous fiber-reinforced thermoset composites.

Another object of this invention is to provide a system and process for robot-assisted 3D printing of continuous fiber-reinforced thermoset composites with thermoset being cured on demand in situ.

A further object of this invention is to provide a system and process for robot-assisted 3D printing of continuous fiber-reinforced thermoset composites that greatly reduce the manufacturing cost and are more time- and energy-efficient than the high energy waste in thermal curing of thermoset composites using autoclaves or ovens to cure prefabricated structures in the traditional composite manufacturing industry.

A yet further object of this invention is to provide a system and process for fabricating complex 3D structures from continuous fiber-reinforced thermoset composites that can be easily integrated with extrusion-based 3D printers and that are compatible with various functional materials that are used for extrusion.

In general, in a first aspect, the invention relates to a system for robot-assisted three-dimensional printing of continuous fiber-reinforced thermoset composites (CFRTCs). The system includes a robot and a printhead assembly configured to be attached to the robot as a tool head. The printhead assembly has a continuous fiber feeding module, a resin coating module, and an in-situ resin curing module.

In an embodiment, the robot is a collaborative robot, a mobile robot, or a semi- or fully autonomous robot.

In an embodiment, the robot has a robotic arm.

In an embodiment, the continuous fiber feeding module has a fiber inlet configured to supply a continuous fiber material to the printhead assembly.

In an embodiment, the continuous fiber feeding module has one or more guide structures that control feeding of the continuous fiber material to the resin coating module.

In an embodiment, the resin coating module comprises a resin inlet, a coating chamber, a tapered outlet and, optionally, a central passageway within the coating chamber through which the continuous fiber material passes.

In an embodiment, the in-situ resin curing module has a power supply, a printhead, and a conductive electrode.

In an embodiment, the in-situ resin curing module is configured to apply a current through the printhead for localized heating of the continuous fiber material infused with the resin agent to form the CFRTC.

In an embodiment, the heating is Joule, resistive, resistance, or Ohmic heating.

In an embodiment, the conductive electrode contacts the printhead, and the in-situ resin curing module has a second conductive electrode in contact with the CFRTC.

In an embodiment, the in-situ resin curing module applies a current through the printhead for localized heating to a curing temperature between about 60° C. and about 200° C.

In an embodiment, the printhead assembly has a motorized module that supplies power to move the continuous fiber material.

In general, in a second aspect, the invention relates to a process for fabricating continuous fiber-reinforced thermoset composites (CFRTC) using the system of the first aspect.

In an embodiment, the process includes supplying a continuous fiber material from a continuous fiber spool to the continuous fiber feeding module; feeding the continuous fiber material from the continuous fiber feeding module to the resin coating module; infusing the continuous fiber material with a resin agent in the resin coating module; and curing the continuous fiber material infused with resin agent using the in-situ resin curing module.

In an embodiment, the curing step further includes passing the continuous fiber material infused with the resin agent through a printhead of the in-situ resin curing module.

In an embodiment, the curing step further includes applying a current to the continuous fiber material infused with the resin agent for localized Joule, resistive, resistance, or Ohmic heating of the continuous fiber material and resin agent.

In an embodiment, the curing step further includes heating the continuous fiber material infused with the resin agent to a curing temperature using the in-situ resin curing module.

In an embodiment, the curing temperature is between about 60° C. and about 200° C.

In an embodiment, the robot is programmed to automate one or more of the steps of supplying the continuous fiber material, feeding the continuous fiber material, infusing the continuous fiber material with the resin agent, or curing the continuous fiber material infused with the resin agent.

BRIEF DESCRIPTION OF THE DRAWINGS

The above and other objects and advantages of this invention may be more clearly seen when viewed in conjunction with the accompanying drawing wherein:

FIGS. 7A through 7G are photographs of representative printed structures using two particular types of thermally curable epoxy resins and two particular types of continuous carbon fiber according to an illustrative embodiment of the invention disclosed herein having different angles (7A), resolutions or printing lengths (7B), carbon fibers (7C), continuous structure printing (7D), a fabric-like wall structure (7E), a cubic frame (as lattice structure building block) (7F), and tension manipulation for structuring (7G).

DETAILED DESCRIPTION OF THE INVENTION

Figure 1A:
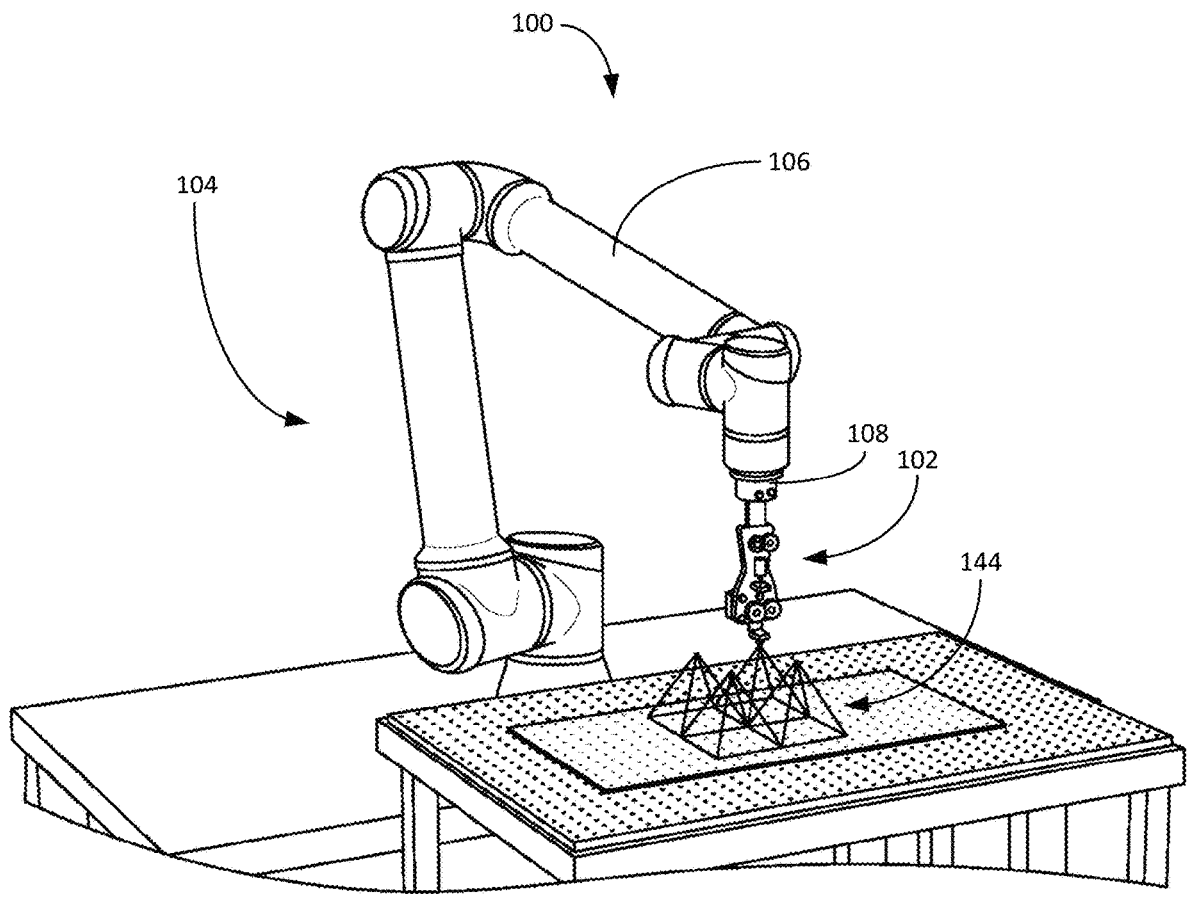
FIG. 1A illustrates a system for robot-assisted 3D printing of continuous fiber-reinforced thermoset composites according to an illustrative embodiment of the invention disclosed herein.

While this invention is susceptible to embodiment in many different forms, there are shown in the drawings and will herein be described hereinafter in detail some specific embodiments of the invention. It should be understood, however, that the present disclosure is to be considered an exemplification of the principles of the invention and is not intended to limit the invention to the specific embodiments so described.

The invention relates to a system and process for robot-assisted 3D printing of continuous fiber-reinforced thermoset composites. The inventive system and process include a printhead assembly configured to be attached to a robot as a tool head for manufacturing continuous fiber-reinforced thermoset composites (CFRTCs). The inventive system and process can process and pattern multiple functional materials with complex geometries from nanoscale to macroscale. For example, the fabricated CFRTCs can be used in product manufacturing for vehicle structure/frame/parts, airplane wing structures, wind turbine blades, personal or unmanned aerial vehicles, furniture, in-space structural components, transportation facilities, vessels, and other structures in the aerospace, automotive, defense, transportation, and wind energy sectors. The inventive system and process for robot-assisted fabricated CFRTCs overcome the limitations of traditional thermally cured thermoset composite manufacturing and provide versatile 3D printing of high-quality continuous fiber composites.

Figure 1B:
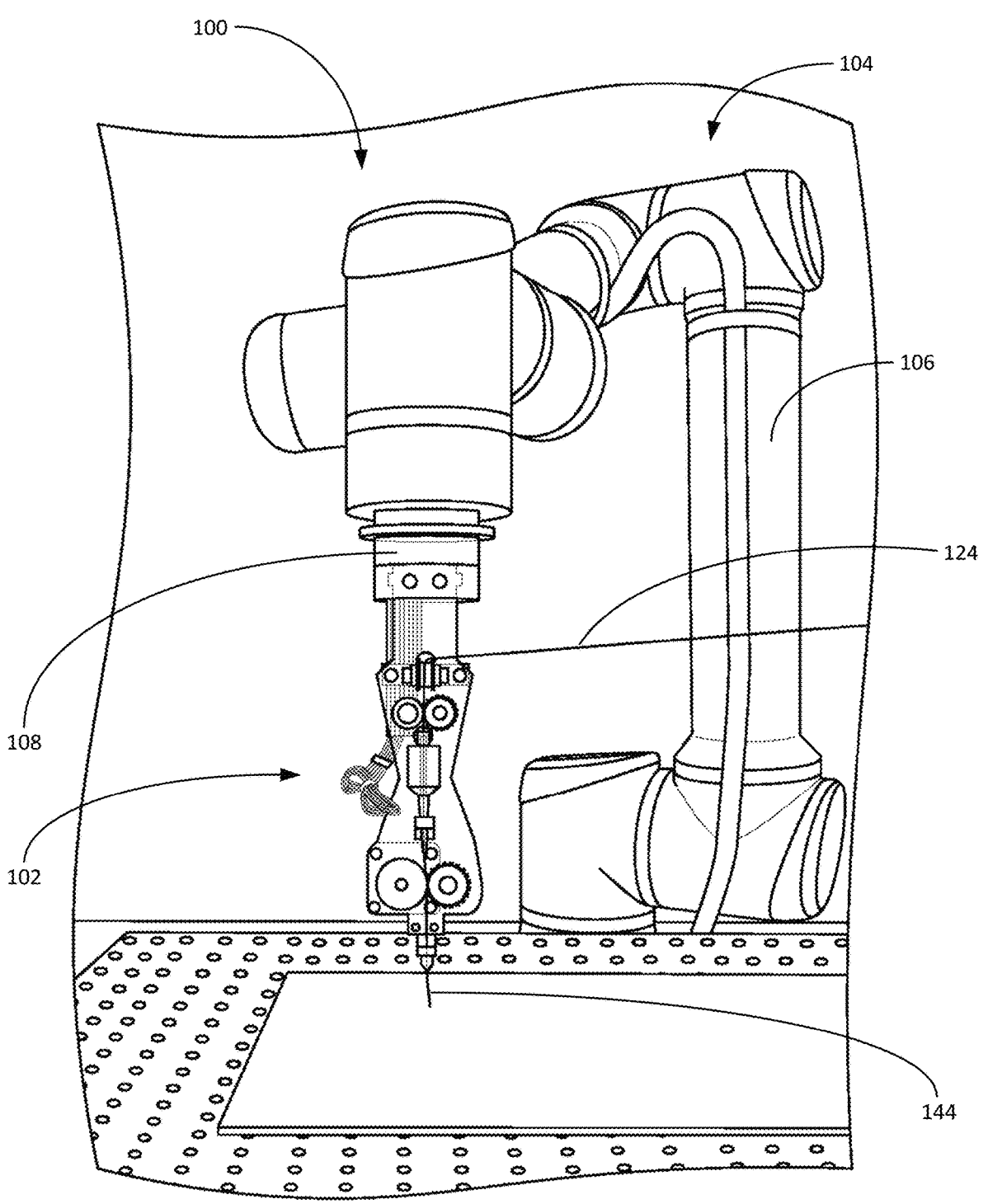
FIG. 1B is a front elevation view of a system for robot-assisted 3D printing of continuous fiber-reinforced thermoset composites according to an illustrative embodiment of the invention disclosed herein.

As illustrated in the figures herein, the inventive system 100 for robot-assisted 3D printing disclosed herein includes a printhead assembly 102 attached as a tool head to a robot 104. Examples of suitable robots include collaborative robot systems (e.g., CR10S collaborative robot, UR10e collaborative robot), mobile robots (e.g., unmanned aerial vehicles, automated guided vehicles), and semi- or fully-autonomous service robots. In one embodiment, the robot 104 has a robotic arm 106 with the printhead assembly 102 for 3D continuous fiber structure fabrication mounted thereto. FIGS. 1A and 1B depict an exemplary embodiment of the printhead assembly 102 mounted to a robot 104 having a six-axis robotic arm 106. It will be appreciated that the robotic arm 106 may include 1, 2, 3, 4, 5, 6, 7, 8, 9 or more axes in various embodiments. The printhead assembly 102 optionally includes a dedicated mounting assembly 108 that facilitates removable attachment to the robot 104 via one or more fasteners 110 (e.g., screws).

Figure 2A:
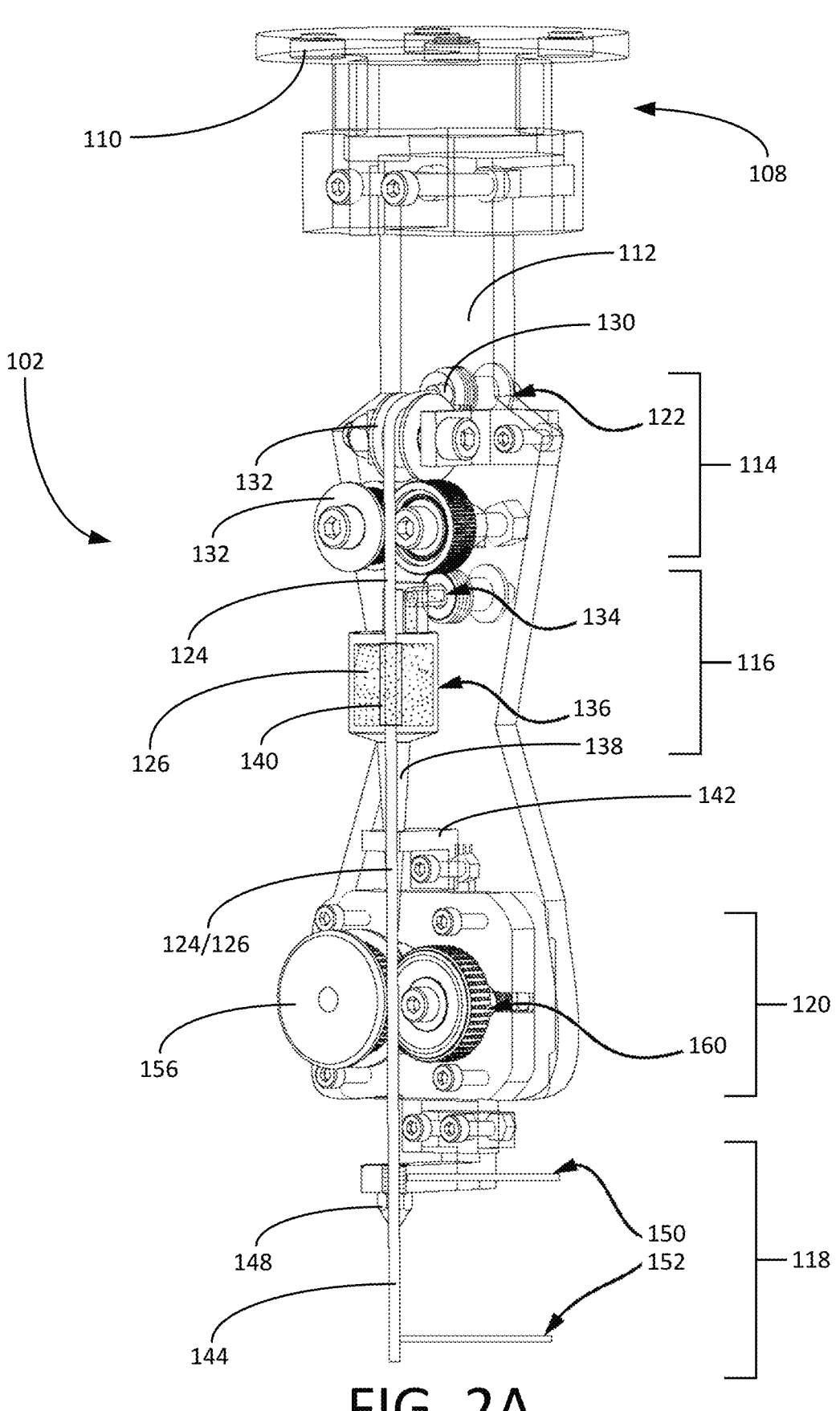
FIG. 2A is a perspective elevation view of a printhead assembly configured for attachment to a robot as a tool head according to an illustrative embodiment of the invention disclosed herein.

The printhead assembly 102 may be configured to extrude, pull, guide, or otherwise manipulate a composite thermosetting resin and continuous fibers materials. As depicted in FIG. 2A, the printhead assembly 102 includes a base 112 with a continuous fiber feeding module 114, a resin coating module 116, an in-situ resin curing module 118, and a motorized module 120 configured thereon.

Figure 2B:
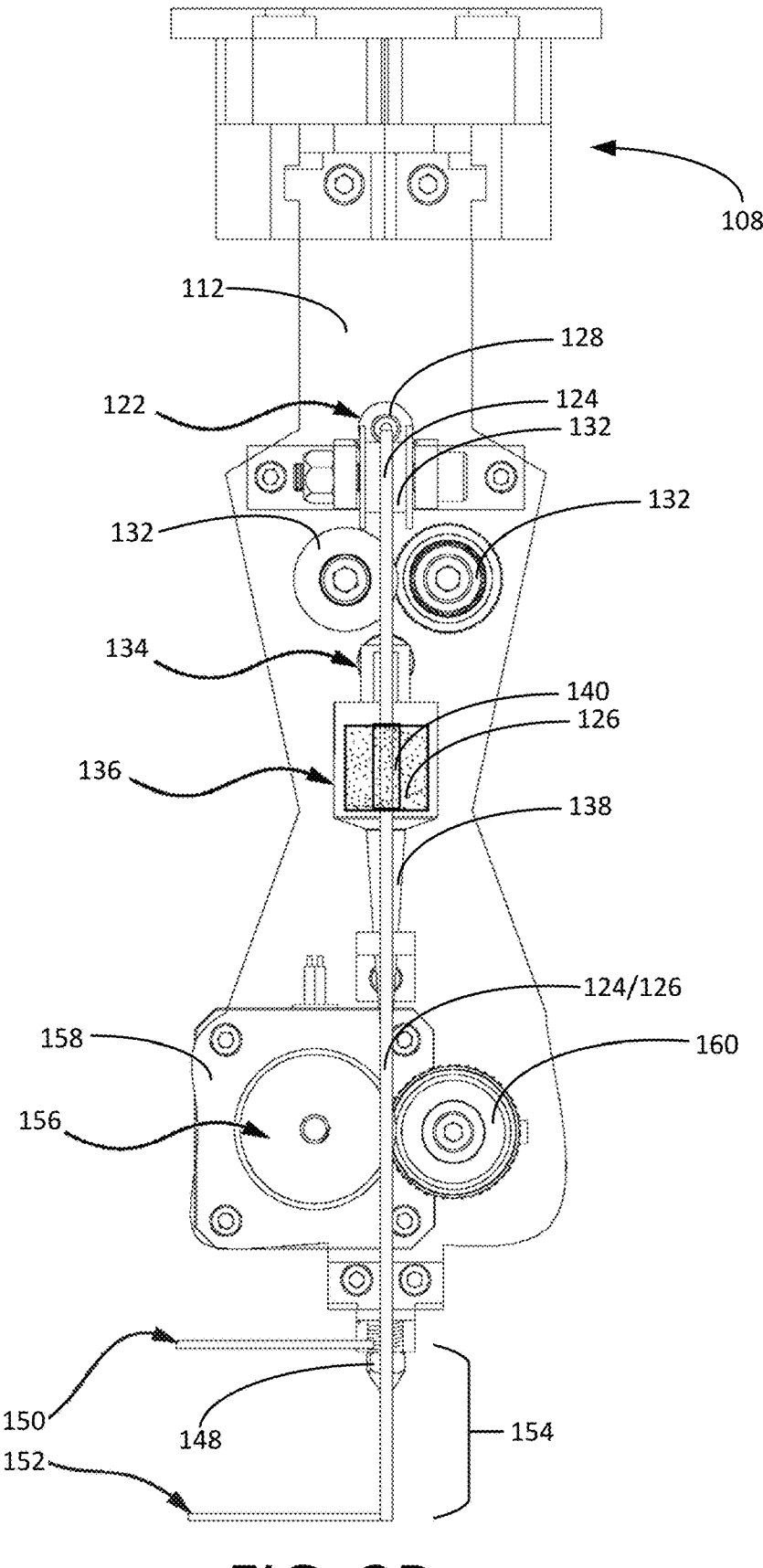
FIG. 2B is a front elevation view of the printhead assembly shown in FIG. 2A.
Figure 3:
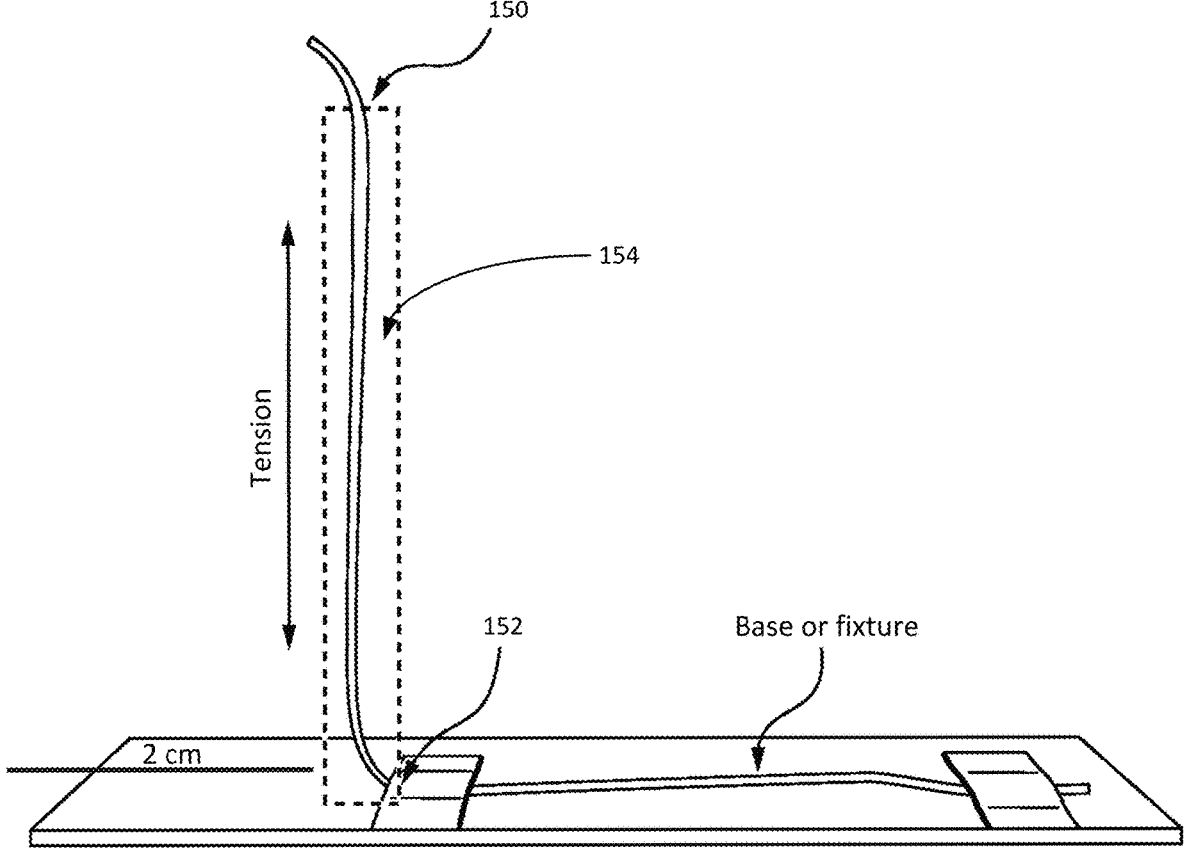
FIG. 3 is a working illustration of a system for robot-assisted 3D printing of continuous fiber-reinforced thermoset composites according to an illustrative embodiment of the invention disclosed herein.

As exemplified, the continuous fiber feeding module 114 has a fiber inlet 122 configured to supply a dry continuous fiber material 124 from a continuous fiber spool (not shown) to the printhead assembly 102. Suitable continuous fiber materials include, without limitation, carbon fiber, boron fiber, silicon carbide fiber, and alumina fiber. The fiber inlet 122 may include an aperture 128 in the base 112 of the printhead assembly 102 and an inlet tube 130 extending through the aperture 128, where the inner diameter of the inlet tube 130 is approximately equal to or larger than the diameter of the continuous fiber material 124 that is received through the fiber inlet 122. The continuous fiber feeding module 114 is configured to feed the continuous fiber material 124 to the resin coating module 116. To control feeding of the continuous fiber material 124 to the resin coating module 116, the continuous fiber feeding module 114 may include one or more guide structures 132. FIGS. 2A and 2B illustrate a non-limiting exemplary combination of a grooved roller wheel and passive pinch rollers as guide structures 132, where the dry continuous fiber material 124 passes over the grooved roller wheel and between two pinch rollers to control feeding into the resin coating module 116.

At the resin coating module 116, a composite thermosetting resin, such as an epoxy resin, and a curing agent (collectively, a "resin agent" 126) infuse the continuous fiber material 124. It will be appreciated that continuous fiber material 124 can be infused with the resin agent 126 using various approaches, e.g., running the continuous fiber material 124 through a reservoir containing the resin agent 126, coating the sides of the continuous fiber material 124 with the resin agent 126, etc. In the embodiment of FIGS. 2A and 2B, the resin coating module 116 has a resin inlet 134, a coating chamber 136 through which the continuous fiber material 124 passes, and a tapered outlet 138. In one embodiment, the resin and the curing agent are pre-mixed and delivered to the coating chamber 136 through the resin inlet 134. In another embodiment, the resin is delivered through the resin inlet 134 to the coating chamber 136, where it is mixed with the curing agent, which is separately introduced. The resin coating module 116 optionally includes a central passageway 140 within the coating chamber 136 through which the continuous fiber material 124 is passaged; in such embodiments, the continuous fiber material 124 contacts the resin agent 126 at the lower end of the coating chamber 136 and as it passes through the tapered outlet 138. The tapered outlet 138 may be stabilized by a brace 142.

Figure 4A:
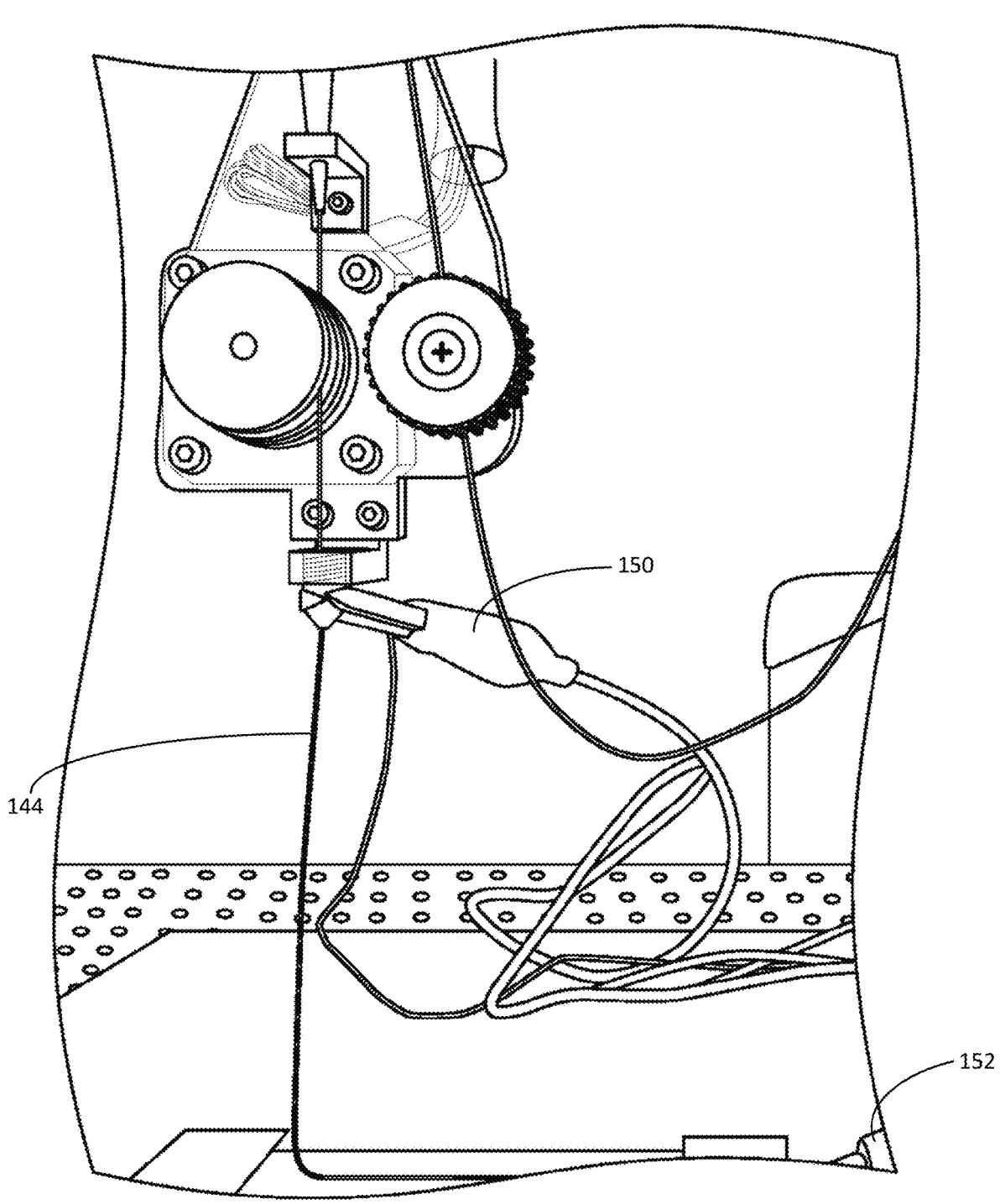
FIG. 4A depicts a system for robot-assisted 3D printing of continuous-reinforced thermoset composites shown in use according to an illustrative embodiment of the invention disclosed herein.
Figure 4B:
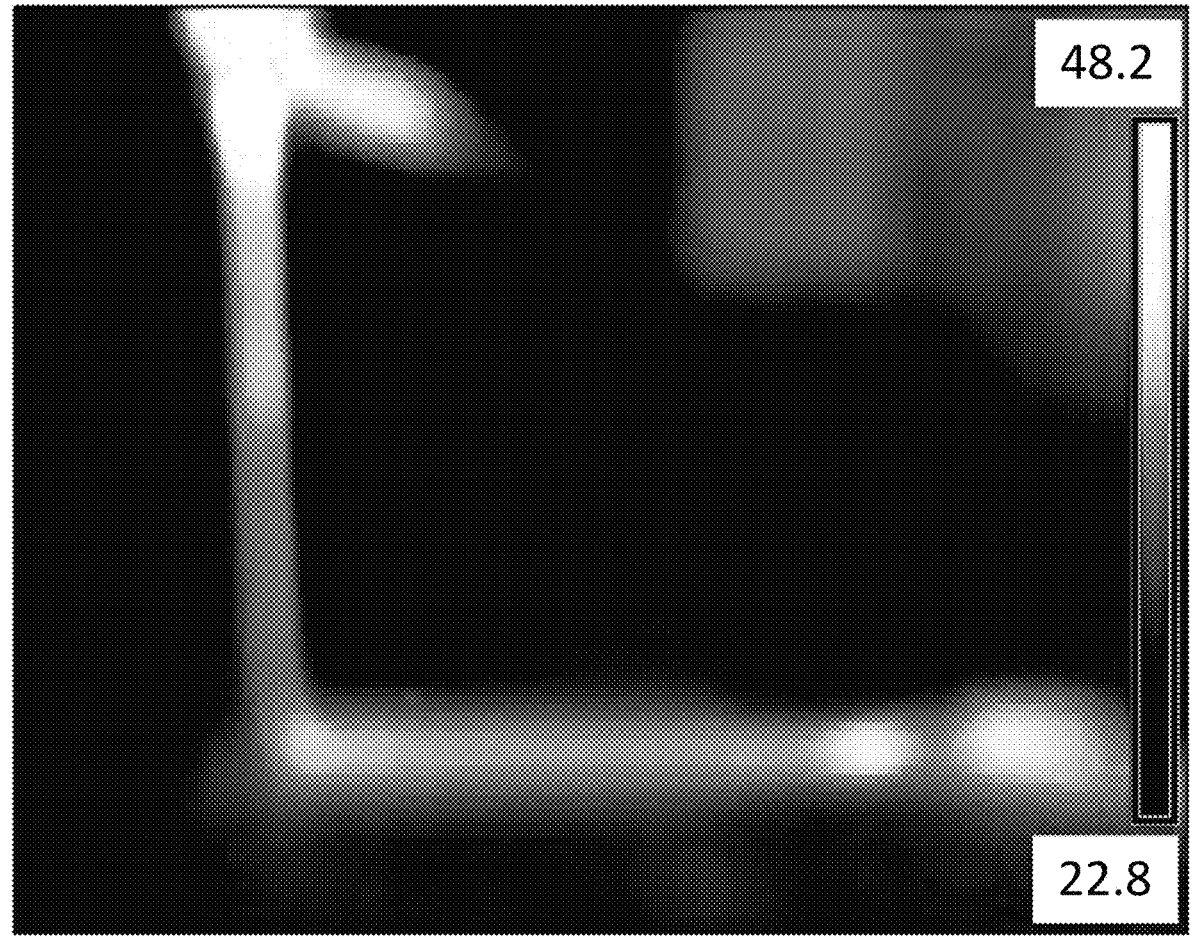
FIG. 4B is a thermal image of the system for robot-assisted 3D printing shown in FIG. 4A.
Figure 5A:
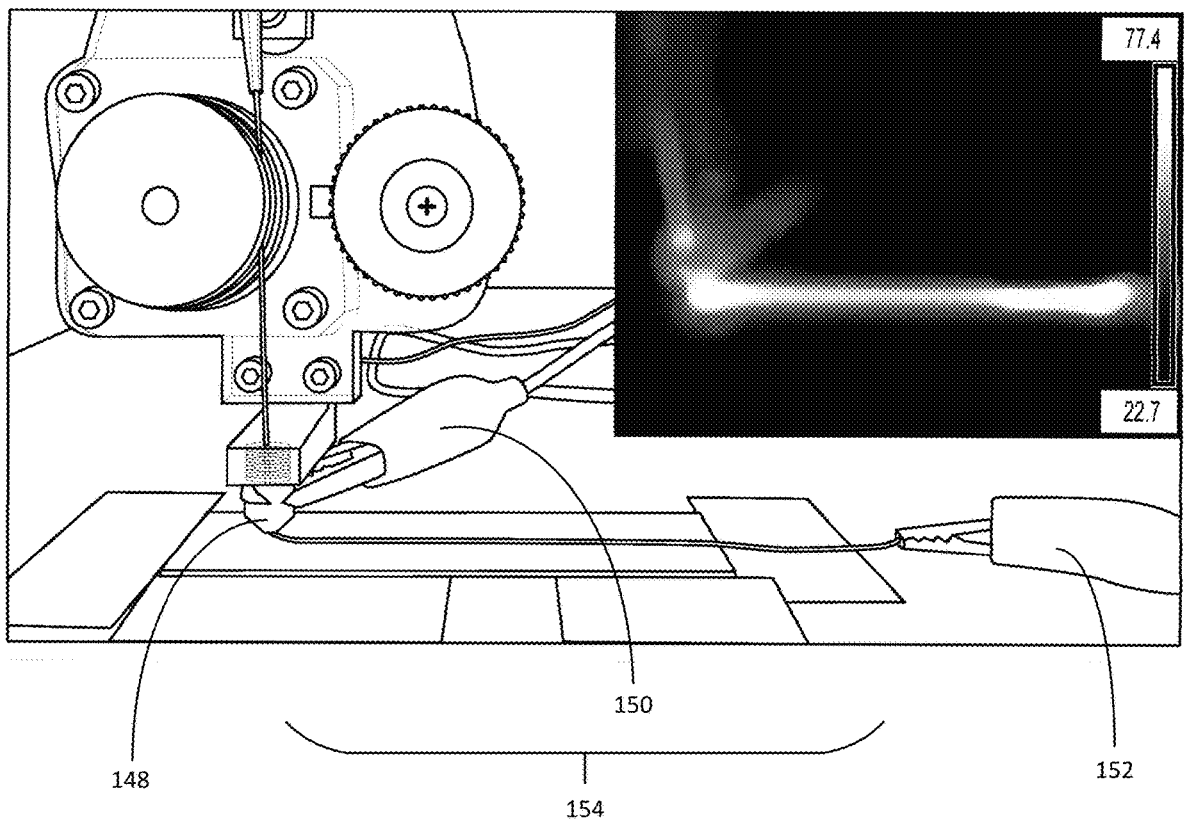
FIG. 5A depicts in situ curing on a plane using a system for robot-assisted 3D printing of continuous fiber-reinforced thermoset composites according to an illustrative embodiment of the invention disclosed herein and a thermal image thereof.
Figure 5B:
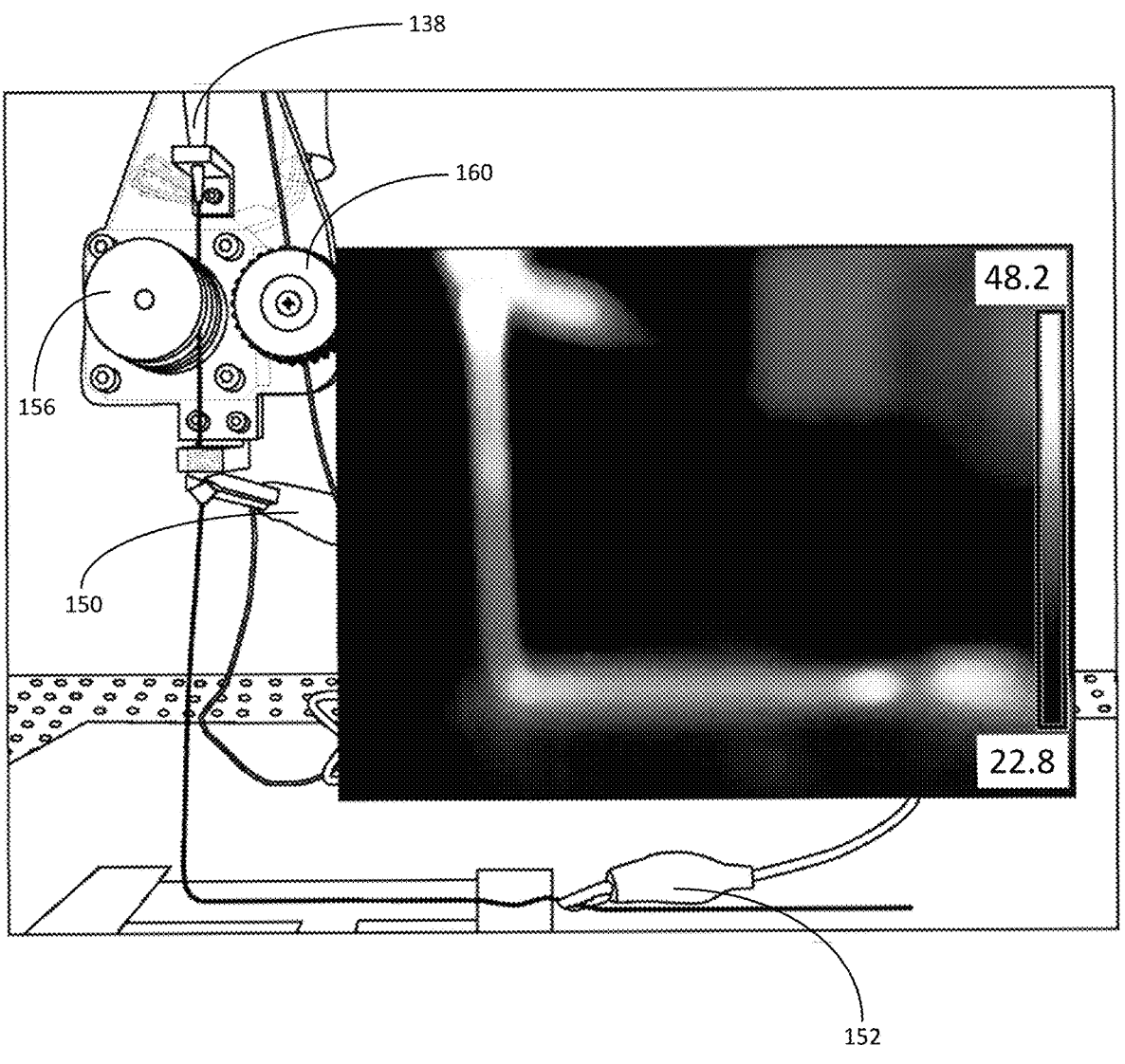
FIG. 5B depicts in situ curing out of the plane using a system for robot-assisted 3D printing of continuous fiber-reinforced thermoset composites according to an illustrative embodiment of the invention disclosed herein and a thermal image thereof.
Figure 6A:
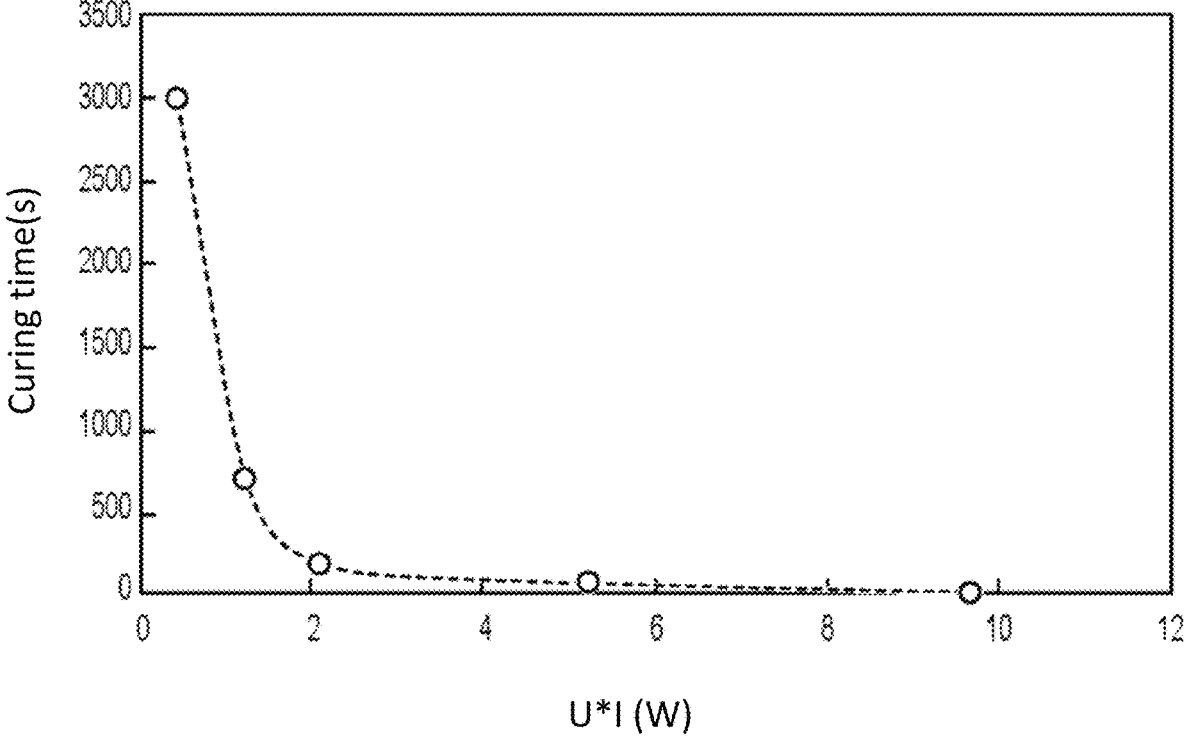
FIG. 6A graphically illustrates the correlation between input energy and curing time for robot-assisted 3D printing of a continuous fiber-reinforced thermoset composite according to the invention disclosed herein, where the continuous fiber length is 5 cm and the continuous fiber diameter is 2 mm.

The continuous fiber material 124 infused with the resin agent 126 is fed from the resin coating module 116 to the in-situ resin curing module 118, which heats and cures the resin agent 126 and continuous fiber material 124 to form CFRTCs 144 on demand. The in-situ resin curing module 118 includes a power supply (not shown), a printhead 148, and a pair of conductive electrodes 150, 152 configured to apply a current through the printhead 148 for localized Joule (or resistive, resistance, or Ohmic) heating (e.g., at a curing temperature of above about 25° C.) to cure the CFRTCs 144. The in-situ resin curing module 118 only generates heat in the required printing section 154 between the pair of conductive electrodes 150, 152 (as shown by the thermal images in FIGS. 4 through 5), and the CFRTCs 144 can be solidified or cured in seconds (see FIGS. 6 and 7). In one embodiment, the first conductive electrode 150 is attached to the printhead, while the second conductive electrode 152 contacts a section of the CFRTC 144 that has passed through the printhead to be solidified or cured.

Figure 6B:
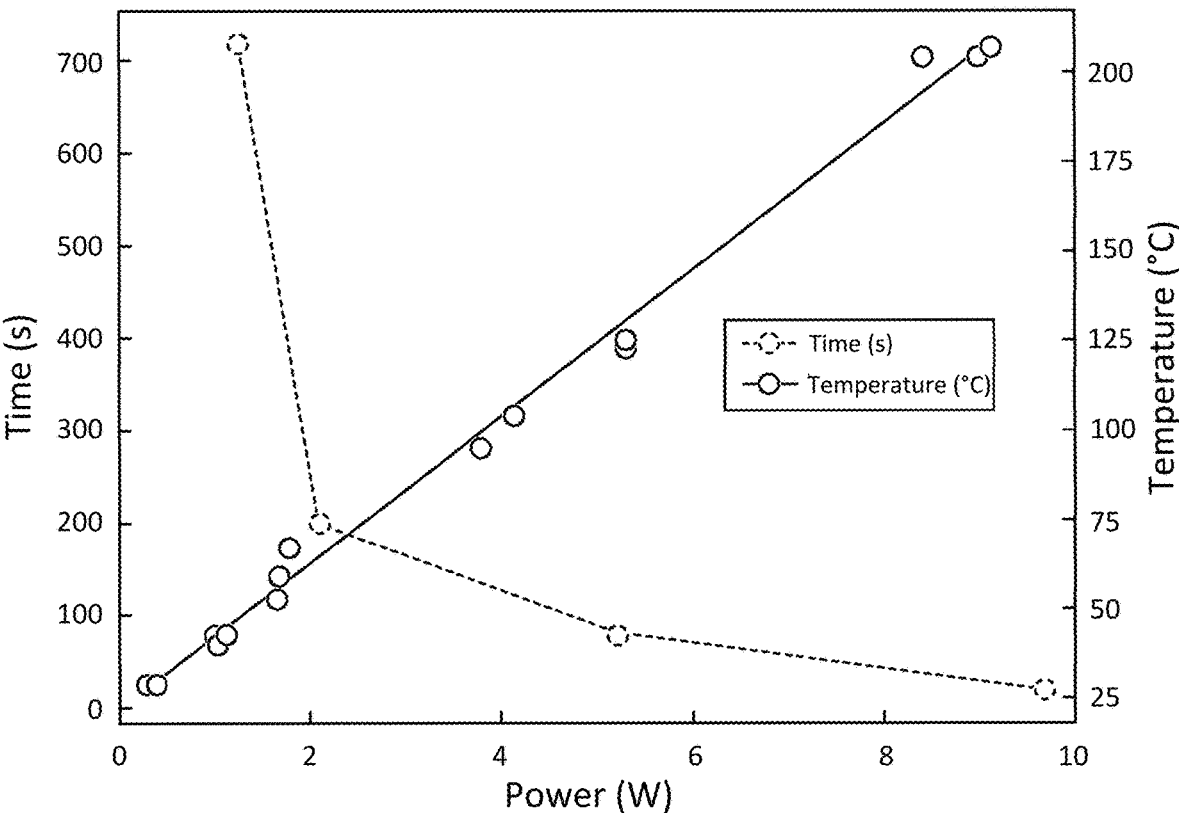
FIG. 6B graphically illustrates the relationship between supplied power, curing time, and curing temperature range of a continuous fiber-reinforced thermoset composite according to the invention disclosed herein.

As illustrated in FIG. 6B, the relationship between supplied power with temperature is proportional while inversely proportional to curing time. The relationship between curing length is proportional to curing time, and the relationship between supplied power and curing length is proportional to each other. The resistive joule heating is generated through a section of the continuous fiber material when supplied with electric power to heat up and cure the infused resin agent 126. The supplied power can be manipulated by directly controlling the voltage supplied, and the supplied voltage is an independently controlled parameter that determines the amount of current pulled and the total power applied for the curing process. As the curing length varies, so do the voltage, current, and power requirements will be varied for curing. Curing length is another independently controlled parameter. The temperature and time required for curing are dependent parameters of the inventive system 100 and process. The curing temperature will vary depending on the specific thermosetting resin used. Typically, the curing temperature varies around between about 60° C. and about 200° C. (e.g., 85° C.) to cure just the thermosetting resin; however, the inventive system 100 and process cure the thermosetting resin-infused continuous fiber material with joule heating, and as such, the curing temperature and time depends on the supplied voltage (power) and curing length of the fiber where the joule heating is applied using the printhead assembly 102.

Although the Figures illustrate an in-situ resin curing module 118 that is heat-assisted, it will be appreciated that the CFRTC 144 can be cured by other means than heat, including, without limitation, by radiation or by catalysis.

The motorized module 120 provides the power necessary to move materials through the printhead assembly 102. As shown in FIGS. 2A and 2B, the motorized module 120 may be positioned on the base 112 of the printhead assembly 102 between the resin coating module 116 and the in-situ resin curing module 118. The motorized module 120 includes a powered feeding roller 156 that receives power from a motor 158 and a passive feeding roller 160. When the motorized module 120 is positioned below the resin coating module 116, the composite thermosetting resin and continuous fiber material 124 pass between the powered feeding roller 156 and the passive feeding roller 160 before entering the in-situ resin curing module 118. In embodiment where the motorized module 120 is positioned above the resin coating module 116, the dry continuous fiber material 124 passes between the powered feeding roller 156 and the passive feeding roller 160.

It will be appreciated that, in various embodiments, one or more steps in the process for robot-assisted three-dimensional fabrication (e.g., supplying the continuous fiber material 124, feeding the continuous fiber material 124 to the resin coating module 116, infusing the continuous fiber material 124 with the resin agent 126 at the resin coating module 116, curing the continuous fiber material 124 infused with the resin agent 126 in the in-situ resin curing module 118, guiding materials with the motorized module 120, etc.) is automated. For example, the robot 104 may be programmed to automatically perform one or more of the process steps.

The curing rate, resistive heating, and other 3D printing process parameters will vary depending on the types of thermally curable resins and continuous fiber materials used in the inventive system 100 and process. The CFRTCs 144 disclosed herein can be fabricated from, for example, which is provided for the purpose of demonstration rather than limitation, two types of thermally curable epoxy resins (e.g., Fibre Glast System 4600 High Temp Infusion Epoxy Resin, and Fibre Glast 2000 Epoxy Resin) and two types of continuous carbon fiber materials (e.g., Toray T300B 3000-40B: number of filaments, "tow" 3000, Toray T300B 1000-50B: number of filaments, "tow" 1000, and Hexcel-HexTow AS4-GP 3K, "tow" 3000) (e.g., FIG. 6A).

Figures 7A, 7B:
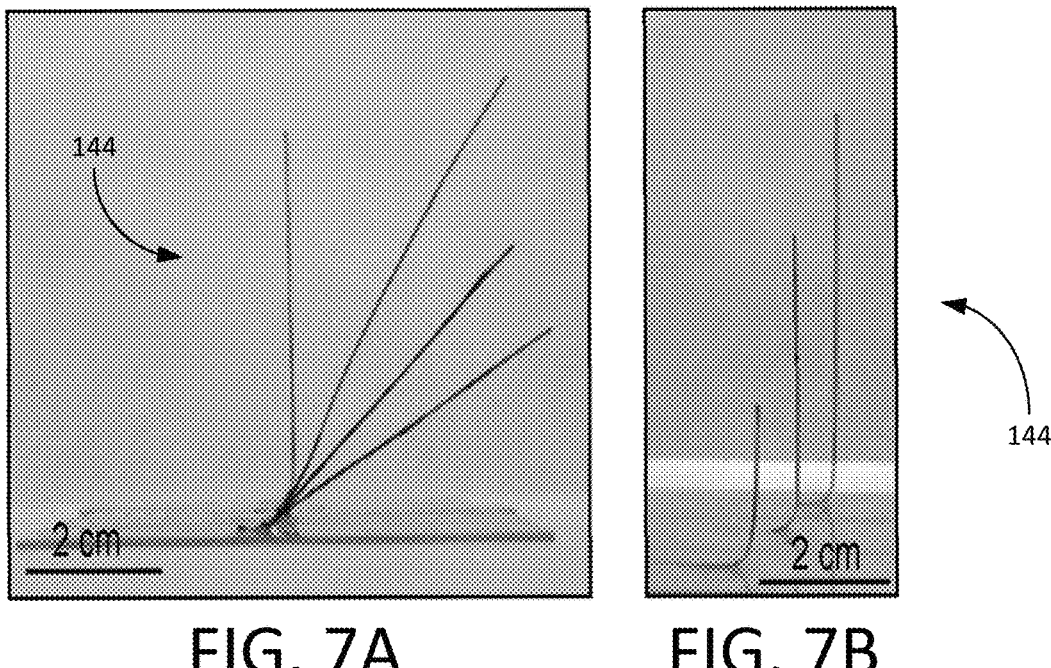
Figures 7C, 7D:
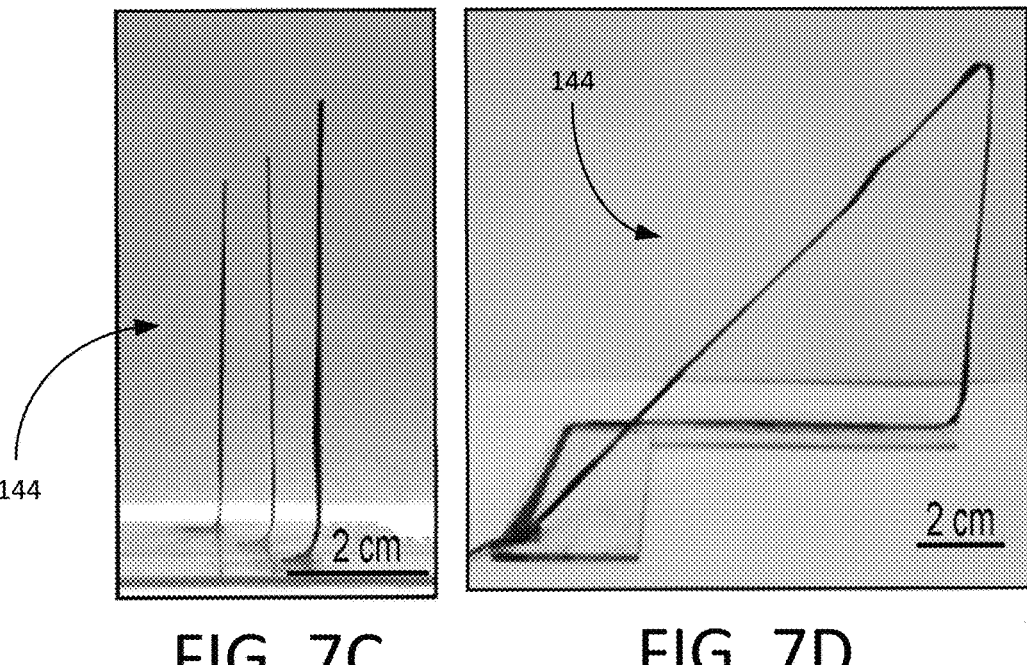

In addition, the curing rate, resistive heating, and other 3D printing process parameters and the types of thermally curable resins and continuous fiber material can be selectively tuned and optimized depending on the desired properties of the fabricated composites so that different structures can be formed. (e.g., FIGS. 7A-7G). FIG. 7A illustrates that the CFRTCs 144 can be 3D printed at various angles, including about 90 degrees, about 70 degrees, about 45 degrees, and about 30 degrees with reference to the base or fixture in the non-limiting depicted examples. The 3D printing process parameters may be controlled to produce multiple CFRTCs 144 with different resolutions or printing lengths (FIG. 7B) or from different carbon fibers (FIG. 7C). FIG. 7D depicts an exemplary CFRTC 144 that has been shaped with continuous structure printing. Complex interlocking structures, such as the interlocking fabric-like structure depicted in FIG. 7E, may be mimicked in ways that traditional layer-by-layer printing is unable to accomplish. FIG. 7F demonstrates the use of the CFRTCs 144 to form a cubic frame, e.g., as the building block for a lattice structure. As illustrated by FIG. 7G, leveraging the tension on the continuous fiber material 124 between the cured composites and the printhead 148 provides greater control over the formation of structures using the CFRTCs 144.

For purposes of the disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a process comprising two or more defined steps, the defined steps can be carried out in any order or simultaneously (except where context excludes that possibility), and the process can also include one or more other steps which are carried out before any of the defined steps, between two of the defined steps, or after all the defined steps (except where context excludes that possibility).

Still further, additional aspects of the invention may be found in one or more appendices attached hereto and/or filed herewith, the disclosures of which are incorporated herein by reference as if fully set out at this point.

Thus, the invention is adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A process for fabricating a continuous fiber-reinforced thermoset composite (CFRTC) using a robot-assisted three-dimensional printing system, the process comprising:
   supplying a continuous fiber material from a continuous fiber spool to a continuous fiber feeding module of a printhead assembly;
   feeding the continuous fiber material from the continuous fiber feeding module to a resin coating module of the printhead assembly;
   infusing the continuous fiber material with a resin agent in the resin coating module; and
   curing the continuous fiber material infused with the resin agent using an in situ resin curing module of the printhead assembly, wherein the curing step is performed on demand during the fabrication of the CFRTC;
   wherein the curing step further comprises applying a current to the continuous fiber material infused with the resin agent for localized Joule, resistive, resistance, or ohmic localized heating; and
   wherein the localized heating is applied through a section of the continuous fiber material between a first conductive electrode on the printhead and a second conductive electrode in contact with the CFRTC.

2. The process of claim 1 wherein the curing step further comprises passing the continuous fiber material infused with the resin agent through a printhead of the in situ resin curing module.

3. The process of claim 1 wherein the curing step further comprises heating the continuous fiber material infused with the resin agent to a curing temperature using the in situ resin curing module.

4. The process of claim 3 wherein the curing temperature is between about 60° C. and about 200° C.

5. The process of claim 1 wherein the robot-assisted three-dimensional printing system is programmed to automate one or more of the steps of supplying the continuous fiber material, feeding the continuous fiber material, infusing the continuous fiber material with the resin agent, or curing the continuous fiber material infused with the resin agent.

6. The process of claim 1, wherein the continuous fiber feeding module comprises one or more guide structures that control the feeding of the continuous fiber material to the resin coating module.

7. The process of claim 1, wherein the resin coating module comprises a coating chamber and a tapered outlet, and the infusing step is performed by passing the continuous fiber material through the tapered outlet while contacting the resin agent.

8. The process of claim 1, wherein the robot-assisted three-dimensional printing system comprises a collaborative robot system, a mobile robot, or a semi- or fully autonomous service robot.

9. The process of claim 1, wherein the infusing step is performed using the resin coating module that comprises a resin inlet, a coating chamber, and a tapered outlet.

10. The process of claim 9, wherein the infusing step further comprises passing the continuous fiber material through a central passageway within the coating chamber as the continuous fiber material is infused with the resin agent.

11. The process of claim 1, wherein the curing step is performed using the in situ resin curing module that comprises a power supply, a printhead, and a conductive electrode.

12. The process of claim 1, further comprising the step of powering a motorized module within the printhead assembly to move the continuous fiber material through the printhead assembly.

13. The process of claim 1, wherein the continuous fiber material comprises at least one of carbon fiber, boron fiber, silicon carbide fiber, and alumina fiber.

14. The process of claim 1, wherein the current applied to the continuous fiber material infused with the resin agent is varied.

* * * * *